Jan. 25, 1927.
M. H. HARTZELL
FASTENING DEVICE
Filed June 28, 1926
1,615,698
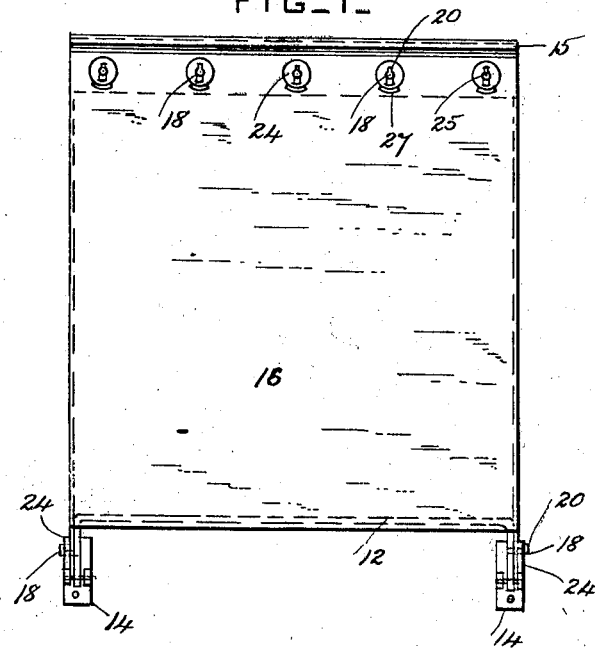
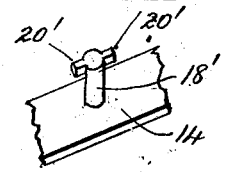
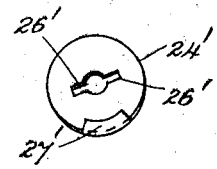
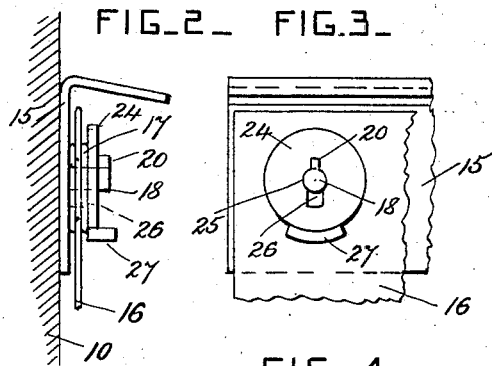
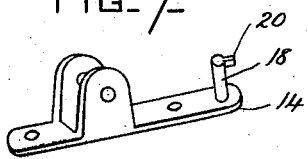
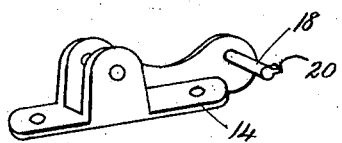
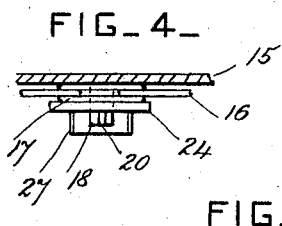
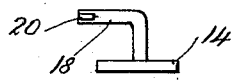
Inventor
Morris H. Hartzell
by Herbert W. S. Jenner
Attorney.

Patented Jan. 25, 1927.

1,615,698

UNITED STATES PATENT OFFICE.

MORRIS H. HARTZELL, OF PHILADELPHIA, PENNSYLVANIA.

FASTENING DEVICE.

Application filed June 28, 1926. Serial No. 119,029.

This invention relates to awnings for windows; and it consists of a fastening device for the canvas or other awning material constructed as hereinafter fully described and claimed, and which permits the canvas to be removed from the frame whenever desirable.

In the drawings: Figure 1 is a front view of an awning provided with fastening devices according to this invention. Fig. 2 is a side view of one of the fastening devices. Fig. 3 is a front view, and Fig. 4 is a plan view of the same. Fig. 5 is a perspective view of a fastening stud showing a modification. Fig. 6 is a perspective view of a washer showing a modification. Figs. 7 and 8 are perspective views of frame brackets provided with modified arrangement of the studs. Fig. 9 is a side view of a hook-shaped stud.

The window frame 10, or the wall adjacent to it, has an awning frame 12 of any approved construction secured to it. The arms of this frame are usually pivoted to brackets 14. A bar 15 is usually secured above the window opening. The canvas or other flexible material 16 of the awning is provided with eyelets 17 of any approved make. Fastening studs 18 are provided, and are arranged to project from the brackets 14, or from the bar 15, or from any other stationary part to which the canvas 16 is to be connected. Each of these studs has a lateral projection or retaining lug 20 on its free end portion, and the eyelets are made large enough to slip onto the studs over these projections. The studs 18 are preferably arranged so that the lugs project upwardly.

Each stud is provided with a fastening washer 24 for the canvas, having a hole 25 which fits loosely on the stud, and a slot 26 at one side of the hole which enables the washer to be slipped onto the stud over the lug 20. The washer has also a weight 27 at its outer portion, and when the lugs 20 project upwardly the weights 27 are preferably arranged on the same side of the holes 25 at the slots 26.

The eyelet of the canvas is slipped onto the stud, and the washer is then slipped onto the stud past its retaining lug until it bears on the canvas, and is then turned around on the stud so that the slot is out of line with the lug, and the weight is below the stud. The weight, and the frictional contact of the washer with the canvas together hold the washer from turning back so that it can not slip off the stud. The back of the washer can be corrugated, humped or roughened in any approved way to increase its frictional resistance. The canvas is in this manner securely held in place, and can be removed and replaced as often as desirable. This form of fastening is better than screws, or bolts with nuts, as the washers do not become rusted in place, and they bear with flat surfaces against the eyelets and do not bend or distort them in any way.

The studs secured to the brackets 14 may be straight or hook-shaped, according to the form of the bracket and the location of the stud upon it. In the modification shown in Figs. 5 and 6 the stud 18' is provided with two fastening lugs 20' arranged diametrically opposite to each other. The washer 24' is provided with two slots 26' so as to slip over the lugs 20', and the weight 27' is arranged at the outer part of the washer between the slots when the lugs 20' are arranged vertically as shown in Fig. 1.

What I claim is:

1. A fastener for eyeleted fabrics, comprising a stationary support, a non-revoluble stud projecting horizontally from the support and adapted to receive the eyelet and provided with a lateral projection on its free end portion beyond the eyelet, and a fastening washer for the eyelet rotatable on the stud between the said projection and the eyelet and having a slot free to pass over the projection, and having also a weight which operates to retain the washer on the stud with the slot out of line with the projection.

2. A fastener as set forth in claim 1, but provided with a plurality of projections and slots, and having a single weight which retains the slots out of line with the projections when the washer is in the fastened position.

In testimony whereof I have affixed my signature.

MORRIS H. HARTZELL.